US008955578B2

(12) United States Patent
Kwon et al.

(10) Patent No.: US 8,955,578 B2
(45) Date of Patent: Feb. 17, 2015

(54) HEAT EXCHANGER AND VENTILATOR HAVING THE SAME

(75) Inventors: Young-Chul Kwon, Seoul (KR); Sung Woo Kim, Suwon-si (KR); Euy Sung Chu, Anyang-si (KR); Jee Yong Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1451 days.

(21) Appl. No.: 11/599,273

(22) Filed: Nov. 15, 2006

(65) Prior Publication Data

US 2008/0017362 A1    Jan. 24, 2008

(30) Foreign Application Priority Data

Jul. 18, 2006  (KR) .................. 10-2006-0067029

(51) Int. Cl.
| | | |
|---|---|---|
| *F28D 9/02* | (2006.01) | |
| *F28D 9/00* | (2006.01) | |
| *F24F 12/00* | (2006.01) | |
| *F28F 9/00* | (2006.01) | |
| *F24F 7/08* | (2006.01) | |

(52) U.S. Cl.
CPC ............ *F28D 9/0062* (2013.01); *F24F 12/006* (2013.01); *F28F 9/001* (2013.01); *Y02B 30/16* (2013.01); *Y02B 30/563* (2013.01)
USPC ................... 165/76; 165/54; 165/78; 165/79; 165/81; 165/82; 165/166; 165/67

(58) Field of Classification Search
USPC ................. 165/76, 78, 79, 81, 82, 166, 54, 67
See application file for complete search history.

(56) References Cited

U.S. PATENT DOCUMENTS

| | | | | | |
|---|---|---|---|---|---|
| 2,961,222 | A | * | 11/1960 | Butt ............................ | 165/166 |
| 4,099,928 | A | * | 7/1978 | Norback .................. | 29/890.039 |
| 4,377,400 | A | * | 3/1983 | Okamoto et al. ................ | 96/13 |
| 4,442,886 | A | * | 4/1984 | Dinulescu ...................... | 165/76 |

(Continued)

FOREIGN PATENT DOCUMENTS

| | | | |
|---|---|---|---|
| EP | 443299 | A1 * | 8/1991 |
| JP | 4-73767 | | 6/1992 |

(Continued)

OTHER PUBLICATIONS

Japanese Office Action issued Oct. 23, 2008 in Japan Application No. 2006-343399.
KR Office Action issued Sep. 27, 2011 in KR Patent Application No. 10-2006-0067029.

*Primary Examiner* — John Ford
(74) *Attorney, Agent, or Firm* — Staas & Halsey LLP

(57) ABSTRACT

A heat exchanger usable with a ventilator, the heat exchanger having an improved structure so that air passing through the heat exchanger may be prevented from leaking. The heat exchanger of the general inventive concept includes a heat-exchanging element having a plurality of liners stacked in a uniformly spaced state and a plurality of spacers disposed between the liners to define air passages, and corner guides respectively coupled to corners of the heat-exchanging element. Each of the corner guides includes a guide channel forming a space to receive the corner of the heat-exchanging element so that the corner guides securely come into close contact with the heat-exchanging element, and to minimize a loosening of the corner guide due to an adhesive applied between the heat-exchanging element and the corner guide.

19 Claims, 5 Drawing Sheets

(56) References Cited

U.S. PATENT DOCUMENTS

| | | | |
|---|---|---|---|
| 4,596,285 A * | 6/1986 | Dinulescu | 165/82 |
| 4,805,695 A * | 2/1989 | Ishikawa et al. | 165/166 |
| 5,183,106 A * | 2/1993 | Stancliffe et al. | 165/166 |
| 5,322,117 A * | 6/1994 | Guetersloh et al. | 165/166 |
| 5,383,516 A * | 1/1995 | Dinulescu | 165/82 |
| 6,267,176 B1 * | 7/2001 | Bolla et al. | 165/166 |
| 6,951,242 B1 * | 10/2005 | Des Champs et al. | 165/54 |

FOREIGN PATENT DOCUMENTS

| | | | | |
|---|---|---|---|---|
| JP | 5-248782 | * | 9/1993 | 165/76 |
| JP | 6-101988 | * | 4/1994 | 165/76 |
| JP | 06101988 A | * | 4/1994 | |
| JP | 6-313694 | | 11/1994 | |
| JP | 06-313694 | | 11/1994 | |
| JP | 2003-290620 | | 10/2003 | |

* cited by examiner

HEAT EXCHANGER AND VENTILATOR HAVING THE SAME

CROSS-REFERENCE TO RELATED APPLICATIONS

This application claims priority under 35 U.S.C. §119(a) from Korean Patent Application No. 2006-67029 filed with the Korea Industrial Property Office on Jul. 18, 2006, the disclosure of which is incorporated herein in its entirety by reference.

BACKGROUND OF THE INVENTION

1. Field of the Invention

The present general inventive concept relates to a heat exchanger that is applicable to a ventilator, and more particularly, to a heat exchanger that is able to minimize leakage of air from corners therein.

2. Description of the Related Art

Generally, a ventilator expels indoor air outdoors and sucks in outdoor air indoors to ventilate an indoor space. In ventilating the indoor space, warm or cold indoor air must be discharged outdoors and warm or cold outdoor air must be introduced indoors. Therefore, ventilating without any filtering process causes much heat loss in the indoor space and may cause an enormous amount of wasted electric power for air-conditioning of the indoor space. To solve this problem, the ventilator is provided with a heat exchanger to exchange heat between air discharged outdoors and air sucked indoors to recycle wasted heat or cold.

An example of such a heat exchanger is disclosed in Japanese Patent Laid-open Publication No. Hei 06-313694. The disclosed conventional heat exchanger includes a body, two metal plates, and four corner members. The body is formed by stacking heat-exchanging sheets and spacers alternately. The two metal plates are each disposed at opposite ends of the body respectively. The four corner members are each attached at one of four corners of the body and the plates respectively. Each of the four corner members has an L-shaped cross-section to fit to the corner of the heat exchanger body and is bonded to the heat exchanger body with silicon to prevent air from leaking through a gap between the corner member and the heat-exchanging sheets.

However, such a conventional heat exchanger has a structure that an inside corner of the corner member abuts the corner of the heat exchanger body. For this reason, a gap may be formed between the corner member and the heat exchanger body in a case that the sizes of the stacked heat-exchanging sheets and the spacers are incorrect. The gap causes air leakage.

Such an air leakage through the gap could be prevented to some extent by using adhesives such as silicon. However, in the conventional heat exchanger the corner member becomes loose from the heat exchanger body because silicon is applied between the corner member and the heat exchanger body. Further, if silicon is not applied uniformly, there still may be air leakage through the gap between the corner member and the heat exchanger body.

Such loosening of the corner member from the heat exchanger body causes a difficulty in mounting the heat exchanger to the ventilator. When the heat exchanger is mounted to the ventilator, the corner member is inserted into an inside of a guide rail provided at the ventilator. If the corner member becomes loose from the heat exchanger body, the corner member and the guide rail interfere with each other and cause a difficulty in mounting the heat exchanger to the ventilator.

Further, in the disclosed conventional heat exchanger, the metal plates disposed at the opposite ends of the heat exchanger and the corner member are secured to the heat exchanger by screw, so that the heat-exchanging sheets and the spacers may be damaged by the inserted screw and possibly cause air leakage.

SUMMARY OF THE INVENTION

The present general inventive concept provides a heat exchanger usable with a ventilator, the heat exchanger having an improved structure so that air passing through the heat exchanger may be prevented from leaking.

The present general inventive concept provides a heat exchanger usable with a ventilator, the heat exchanger being structured so that corners of the heat exchanger may be easily mounted to an inside of the ventilator without interfering with structures in the ventilator.

Additional aspects and/or advantages of the present general inventive concept will be set forth in part in the description which follows and, in part, will be apparent from the description, or may be learned by practice of the present general inventive concept.

The foregoing and/or other aspects and utilities of the present general inventive concept may be achieved by providing a heat exchanger including a heat-exchanging element having a plurality of liners and a plurality of spacers disposed between the liners, and corner guides respectively coupled to corners of the heat-exchanging element, wherein each of the corner guides includes a guide channel to form a space between each corner of the heat-exchanging element and an inner surface of each corner guide.

The heat exchanger may further include covers to respectively cover opposite ends of the heat-exchanging element, wherein each cover is respectively secured to each corner guide.

The guide channel may include a corner receiving portion into which each corner of the heat-exchanging element is inserted, and a fixing portion expanded from the corner receiving portion and into which a fastener to secure each cover is inserted.

Each cover may include flanges which cover outer sides of the corner guides so as to bring the corner guides into contact with the heat-exchanging element.

The heat-exchanging element may include layers formed by the adjacent liners, and first and second passages disposed in the layers alternatively in first and second directions, respectively.

The corner guide may be respectively coupled to the corners of the first and second passages.

The corner guides may prevent air passing through the first and second passages from being mixed.

The corner guides each may include a fixing portion disposed at a corresponding corner of the heat-exchanging element, and contacts extended from both sides of the fixing portion to contact adjacent sides of the heat-exchanging element.

The both sides of the fixing portion may form a corner receiving portion to receive the corresponding corner.

The corner guides each may further include an adhesive disposed in the corner receiving portion to attach the corner guide to the corner of the heat-exchanging element.

The foregoing and/or other aspects and utilities of the present general inventive concept may also be achieved by providing a heat exchanger including a heat-exchanging element having a plurality of liners and a plurality of spacers disposed between the liners to define air passages, corner guides respectively coupled to side corners of the heat-exchanging element and respectively having a space to receive each corner of the heat-exchanging element, and covers respectively having coupling portions to couple with the corner guides at a position corresponding to the space and respectively disposed at an upper portion and a lower portion of the heat-exchanging element and corner guides.

The foregoing and/or other aspects and utilities of the present general inventive concept may also be achieved by providing a ventilator including a heat exchanger having a plurality of liners stacked in a uniformly spaced state and a plurality of spacers disposed between the liners to perform a heat-exchange between sucked-in outdoor air and discharged indoor air, the heat exchanger further including corner guides respectively coupled to corners of the liners and the spacers, wherein each of the corner guides includes a guide channel forming a space into which each corner of the liners and the spacers is inserted.

The heat exchanger of the ventilator may further include covers secured to the corner guides to form an upper surface and a lower surface of the heat exchanger, and the guide channel may include a corner receiving portion into which each corner of the liners and spacers is inserted, and a fixing portion expanded from the corner receiving portion and into which a fastener to secure the cover is inserted.

The heat exchanger of the ventilator may further include covers to form an upper surface and a lower surface of the heat exchanger and bring the corner guides into close contact with the liners and spacers.

The ventilator may include intake passages disposed opposite first sides of the heat-exchanging element, exhaust passages disposed opposite second sides of the heat-exchanging element, and partitions disposed between the intake and exhaust passages, and the corner guide may be disposed between the corner of the heat-exchanging element and an end of the partition.

The corner guide may include a fixing portion disposed at the corner of the heat exchanging element to be coupled to the end of the partition and contacts to be coupled to adjacent sides of the heat-exchanging element.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
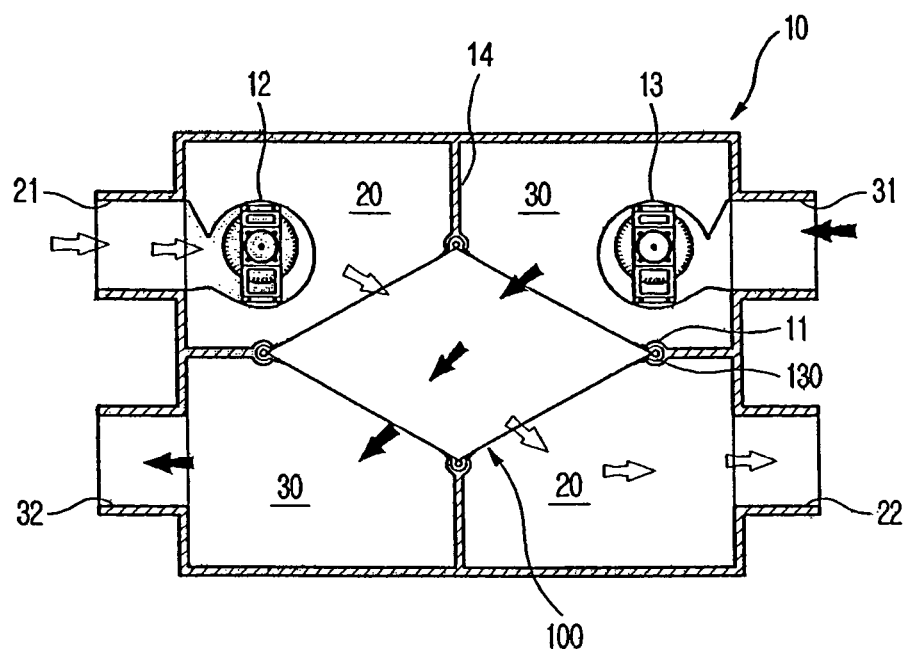
FIG. 1 illustrates a ventilator according to an embodiment of the present general inventive concept.

Reference will now be made in detail to the embodiments of the present general inventive concept, examples of which are illustrated in the accompanying drawings, wherein like reference numerals refer to the like elements throughout the drawings. The embodiments are described below to explain the present general inventive concept, by referring to the figures.

FIG. 1 illustrates a ventilator according to an embodiment of the present general inventive concept.

As illustrated in FIG. 1, the ventilator includes a body 10 provided with an intake passage 20 through which outdoor air is sucked indoors and an exhaust passage 30 through which indoor air is discharged outdoors. The interior of the body 10 is separated into the intake passage 20 and the exhaust passage 30. A plurality of partitions 14 may be included in the body 10 to separate the intake passage 20 from the exhaust passage 30. The intake passage 20 and the exhaust passage 30 are formed to cross in a diagonal direction and heat exchanger 100 is disposed at a crossing point of the intake passage 20 and the exhaust passage 30 to perform heat-exchange between sucked-in outdoor air and discharged indoor air.

The body 10 has guide rails 11 arranged within the body 10 to guide the heat exchanger 100 when placing the heat exchanger 100 within the body 10. The guide rails 11 may be disposed at an end of the partitions 14. Each of the guide rails 11 has a shape corresponding to each of corner guides 130 of the heat exchanger 100 and supports an outer side of the corner guides 130 when mounting the heat exchanger 100 on the body 10. Detailed descriptions of the corner guides 130 will be given later.

One side of the intake passage 20 is provided with an outdoor-side inlet 21 through which outdoor air is sucked in and another side of the intake passage 20 is provided with an indoor-side outlet 22 through which outdoor air passed through the heat exchanger 100 is supplied toward an indoors. Similarly, one side of the exhaust passage 30 is provided with an indoor-side inlet 31 through which indoor air is sucked in and another side of the exhaust passage 30 is provided with an outdoor-side outlet 32, through which indoor air passed through the heat exchanger 100 is discharged toward an outdoors.

The body 10 is also provided with an intake fan 12 to provide a blowing force to suck-in outdoor air indoors and an exhaust fan 13 to provide a blowing force to discharge indoor air outdoors, within the body 10.

Figure 2:
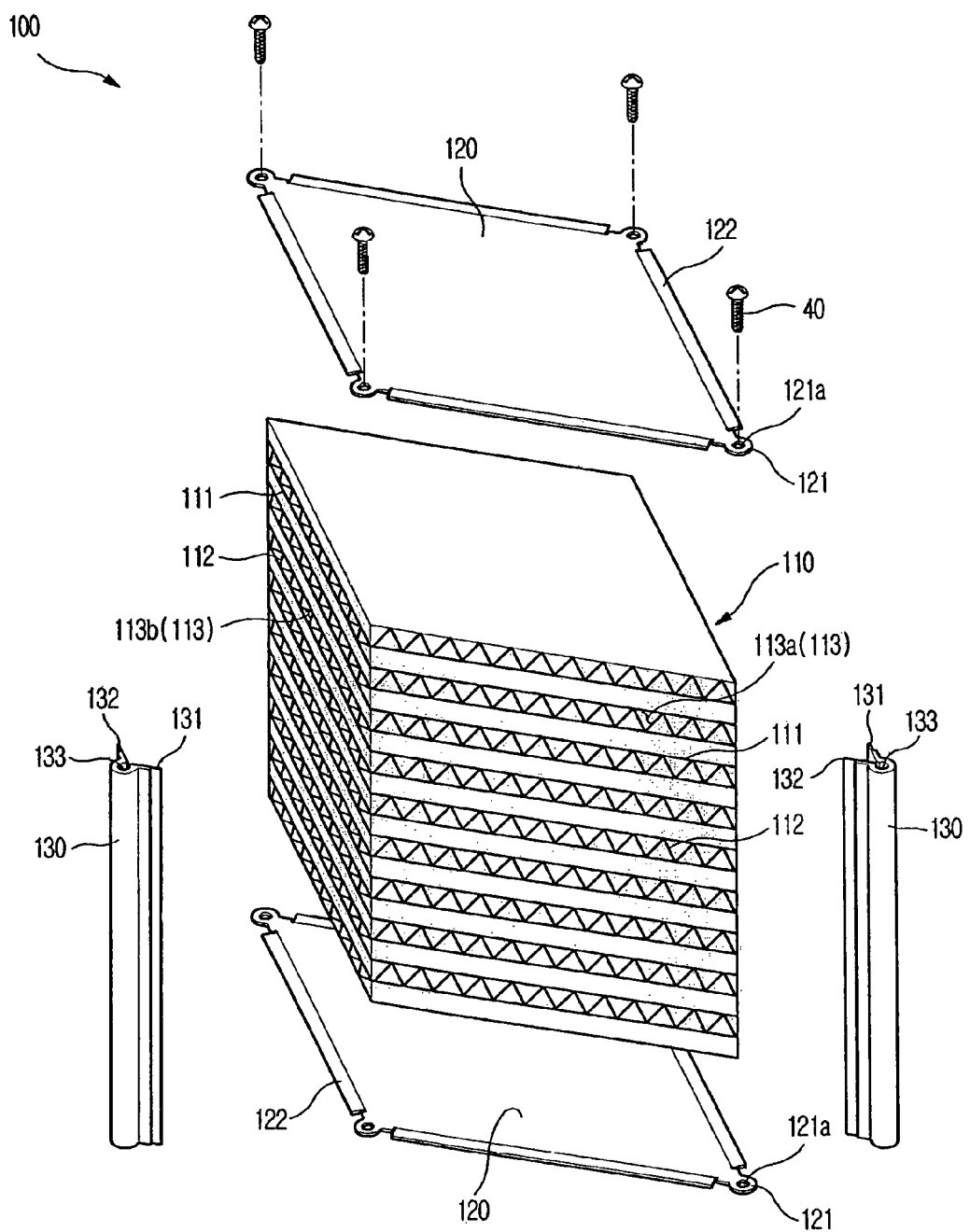
FIG. 2 is an exploded perspective view illustrating a heat exchanger according to an embodiment of the present general inventive concept.
Figure 3:
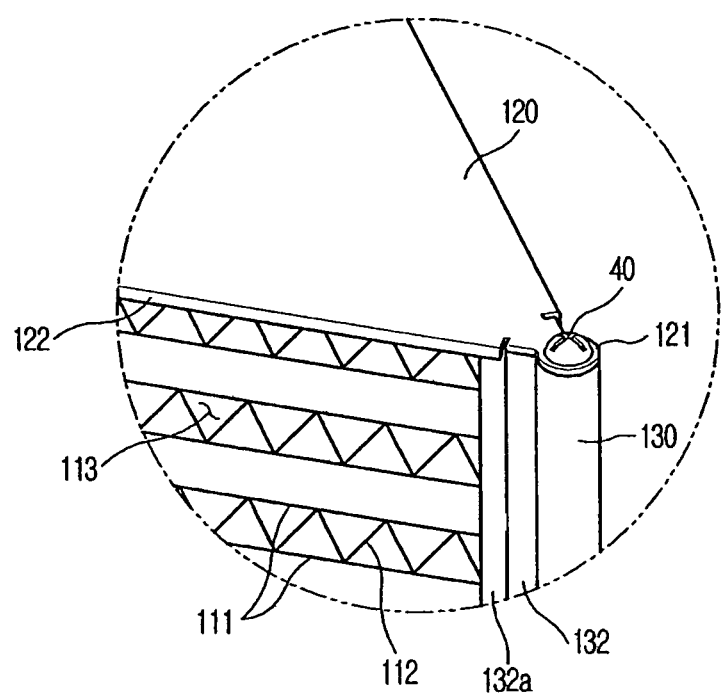
FIG. 3 is a perspective view partially illustrating a main portion of the heat exchanger of FIG. 2.
Figure 4A:
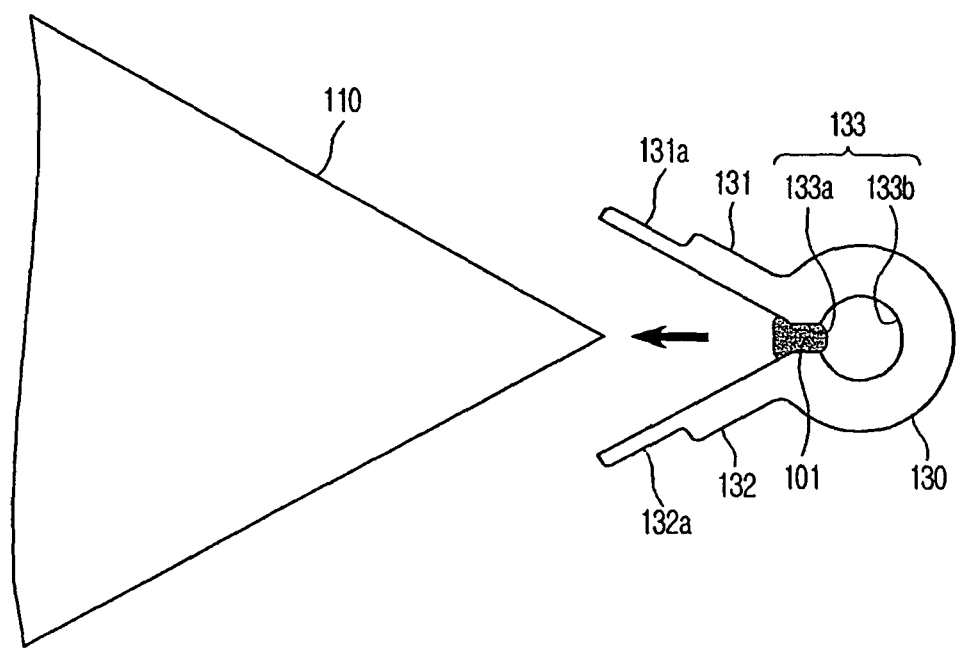
FIGS. 4A and 4B are horizontal cross-sectional views illustrating a process to couple each corner guide to a heat-exchanging element in a heat exchanger according to an embodiment of the present general inventive concept.
Figure 4B:
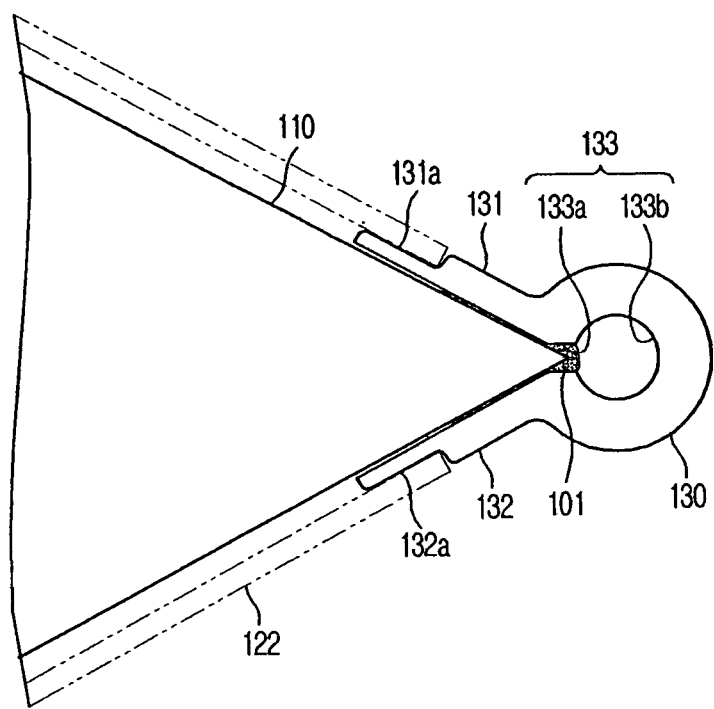

FIG. 2 is an exploded perspective view illustrating a heat exchanger 100 according to an embodiment of the present general inventive concept, FIG. 3 is a perspective view partially illustrating a main portion of the heat exchanger 100 illustrated in FIG. 2, and FIGS. 4A and 4B are horizontal cross-sectional views illustrating a process to couple each corner guide to a heat-exchanging element in the heat exchanger 100 according to an embodiment of the present general inventive concept. In FIG. 2, only two corner guides are illustrated for the sake of convenience. However, the heat exchanger 100 according to the present general inventive concept is not limited thereto and may include more than two corner guides. FIG. 4A illustrates a state before a corner guide is coupled to the heat-exchanging element and FIG. 4B illustrates a state after the corner guide is coupled to the heat-exchanging element.

As illustrated in FIGS. 2 and 3, the heat exchanger 100 has a heat-exchanging element 110 constituted such that sucked-in air from an outdoors and discharged air from an indoors perform a heat-exchange in a separated state from each other. The heat-exchanging element 110 is composed of a plurality of liners 111 stacked in a uniformly spaced state and a plurality of spacers 112 each disposed in a space between the adjacent liners 111 to define air passages 113 for flowing air.

Each of the spacers 112 may be constituted by a corrugated plate forming successively alternating ridges and grooves to maintain a shape of the heat-exchanging element 110 and form the air passages 113 between the liners 111.

The air passages 113 include first air passages 113a to communicate with the intake passage 20 through which sucked-in outdoor air passes from the outdoor side inlet 21 to the indoor side outlet 22 and second air passages 113b to communicate with the exhaust passage 30 through which discharged indoor air passes from the indoor side inlet 31 to the outdoor side outlet 32. The first air passages 113a and the second air passages 113b can be alternately disposed while crossing each other.

In addition to corner guides 130, the heat exchanger 100 may also include metal covers 120, respectively covering an upper portion and a lower portion of the heat-exchanging element 110. Each corner guide 130 is coupled to a side corner of the heat-exchanging element 110. The corner guides 130 protect the corners of the heat-exchanging element 110 and to prevent sucked-in outdoor air and discharged indoor air from being mixed at the corners. The corner guides 130 may prevent air from being mixed between the intake passage 20 and the exhaust passage 30. The corner guide 130 may also prevent air from being mixed between the first and second air passages 113a and 113b.

As illustrated in FIGS. 2, 4A and 4B, each of the corner guides 130 of the present general inventive concept may include contacts 131 and 132 to bring two adjacent sides into contact with an associated corner of the heat-exchanging element 110 when the corner guide 130 is coupled to the heat-exchanging element 110, and a guide channel 133 forming a space between the associated corner of the heat-exchanging element 110 and an inner surface of the corner guide 130. As such, according to the present embodiment, each corner of the heat-exchanging element 110 is received in the guide channel 133 provided in the corner guide 130 without interfering with the corner guide 130 to securely bring the contacts 131 and 132 into close contact with the associated two sides of the heat-exchanging element 110. Thus, there is no air leakage caused by a gap between the heat-exchanging element 110 and each corner guide 130.

As illustrated in FIGS. 4A and 4B, the guide channel 133 may include a corner receiving portion 133a which is connected to the contacts 131 and 132 of each corner guide 130 and into which the associated corner of the heat-exchanging element 110 is inserted when coupled with the heat-exchanging element 110, and a fixing portion 133b expanded toward a direction opposed to the heat-exchanging element 110 from the corner receiving portion 133a. The contacts 131 and 132 may be extended from the fixing portion 133 toward corresponding sides of the heat exchanging element 110 to receive the corner of the heat exchange element 110.

The fixing portion 133b may be used to secure the cover 120 to the corner guide 130 by a fastener 40 such as a screw (see FIGS. 2 and 3). In this case, the cover 120 may have coupling portions 121 to couple with the corner guides 130. Each of the coupling portions 121 may have a coupling hole 121a corresponding to the fixing portion 133b of the guide channel 133 of an associated corner guide 130.

As such, the cover 120 can be secured to the corner guide 130 by using the fixing portion 133b positioned opposite to the heat-exchanging element 110 with reference to the corner receiving portion 133a, so that the heat-exchanging element 110 may be prevented from being damaged in securing the cover 120 to the corner guide 130.

When assembling the corner guide 130 to the associated corner of the heat exchanger element 110, the corner guide 130 may be applied with an adhesive 101, such as silicon, as illustrated in FIGS. 4A and 4B. The associated corner of the heat-exchanging element 110 is received in the corner guide 130 with the adhesive 101 applied on the corner guide 130 so that a part of the adhesive penetrates between the heat-exchanging element 110 and the contacts 131 and 132 of the corner guide 130 and seals the gap between the heat-exchanging element 110 and the corner guide 130. The remaining adhesive is attached to each corner of the heat-exchanging element at the corner receiving portion 133a of each corner guide 130 or discharged out of each corner guide 130 through the fixing portion 133b. Therefore, the present general inventive concept may minimize a loosening of the corner guides 130 caused by the adhesive.

As illustrated FIGS. 2, 3, 4A and 4B, the cover 120 may have flanges 122 bent toward respective sides of the heat-exchanging element 110. The flanges 122 force the upper and lower ends of the contacts 131 and 132 of the corner guide 130 so as to bring the corner guide 130 into close contact with the heat-exchanging element 110. Thereby, the sealing effect obtained between the heat-exchanging element 110 and the corner guides 130 is further improved.

The contacts 131 and 132 also may have, at outer surfaces thereof, stepped surfaces 131a and 132a respectively formed so that the flanges 122 may be mounted to the stepped surfaces respectively.

According to an embodiment of the present general inventive concept, a corner guide may be provided with a space that may receive an associated corner of a heat-exchanging element so that the corner guides can securely come into close contact with the heat-exchanging element, and a loosening of the corner guide due to an adhesive applied between the heat-exchanging element and the corner guide may be minimized. Therefore, air leakage through a gap between the heat-exchanging element and the corner guide may be effectively prevented.

According to the present general inventive concept, when assembling the heat exchanger, damage of the heat-exchanging element may be prevented, and when mounting the heat exchanger within the ventilator, the corner guides may not interfere with the guide rails within the ventilator so as to facilitate placing of the heat exchanger.

Although a few embodiments of the present general inventive concept have been shown and described, it would be appreciated by those skilled in the art that various modifications, additions and substitutions may be made in these embodiments without departing from the principle and spirit of the general inventive concept, the scope of which is defined in the claims and their equivalents.

What is claimed is:

1. A heat exchanger, comprising:
   a heat-exchanging element having a plurality of liners and a plurality of spacers disposed between the liners;
   covers respectively disposed at opposite ends of the heat-exchanging element; and
   corner guides respectively coupled to corners of the heat-exchanging element,
   wherein each of the corner guides comprises a guide channel forming a space between each corner of the heat-exchanging element and an inner surface of each corner guide, and contacts extended from both ends of the guide channel to contact adjacent sides of each corner of the heat-exchanging element,
   wherein the guide channel comprises a corner receiving portion into which each corner of the heat-exchanging element is inserted, and a fixing portion having a cylindrical space between the corner receiving portion and the inner surface of each corner guide to insert a fastener to secure each cover, the cylindrical space having a portion which is open to the corner receiving portion, and wherein each cover comprises flanges which cover outer sides of the corner guides so as to bring the corner guides into contact with the heat-exchanging element, and the contacts include, at outer surfaces thereof, stepped surfaces respectively formed so that the flanges can be mounted to the stepped surfaces respectively.

2. The heat exchanger according to claim 1,
wherein each cover is respectively secured to each corner guide.

3. The heat exchanger according to claim 1, wherein the heat-exchanging element comprises layers formed by the adjacent liners, and first and second passages disposed in the layers alternatively in first and second directions crossing with each other, respectively.

4. The heat exchanger according to claim 3, wherein the corner guides prevent air passing through the first and second passages from being mixed.

5. The heat exchanger according to claim 1, wherein the corner guides each further comprises:
an adhesive disposed in the corner receiving portion to attach the corner guide to the corner of the heat-exchanging element.

6. A heat exchanger, comprising:
a heat-exchanging element having a plurality of liners and a plurality of spacers disposed between the liners to define air passages;
corner guides respectively coupled to side corners of the heat-exchanging element and respectively having a space to receive each corner of the heat-exchanging element; and
covers respectively having coupling portions to couple with the corner guides at a position corresponding to the space and respectively disposed at opposite ends of the heat-exchanging element and corner guides,
wherein each of the corner guides comprises a guide channel forming a space between each side corners of the heat-exchanging element and an inner surface of each of the corner guides, and contacts extended from both ends of the guide channel to contact adjacent sides of each corner of the heat-exchanging element, and
wherein the guide channel comprises a corner receiving portion into which each corner of the heat-exchanging element is inserted, and a fixing portion having a cylindrical space between the corner receiving portion and the inner surface of each corner guide to insert a fastener to secure each cover, the cylindrical space having a portion which is open to the corner receiving portion, and
wherein each cover comprises flanges which cover outer sides of the corner guides so as to bring the corner guides into contact with the heat-exchanging element, and the contacts include, at outer surfaces thereof, stepped surfaces respectively formed so that the flanges can be mounted to the stepped surfaces respectively.

7. The heat exchanger according to claim 6, wherein the cover has flanges bent toward respective sides of the heat-exchanging element, and the flanges cover the upper and lower ends of the corner guides so as to bring the corner guides into close contact with the heat-exchanging element.

8. The heat exchanger according to claim 6, wherein the heat-exchanging element comprises layers formed by the adjacent liners, and first and second passages disposed in the layers alternatively in first and second directions crossing with each other, respectively.

9. The heat exchanger according to claim 8, wherein the corner guide are respectively coupled to the corners of the first and second passages.

10. The heat exchanger according to claim 8, wherein the corner guides prevent air passing through the first and second passages from being mixed.

11. The heat exchanger according to claim 6,
wherein the contacts extended from both sides of the fixing portion to contact adjacent sides of the heat-exchanging element.

12. The heat exchanger according to claim 11, wherein the corner guides each further comprises:
an adhesive disposed in the corner receiving portion to attach the corner guide to the corner of the heat-exchanging element.

13. A ventilator comprising a heat exchanger having a plurality of liners and a plurality of spacers disposed between the liners to perform a heat-exchange between sucked-in outdoor air and discharged indoor air, the heat exchanger further comprising:
corner guides respectively coupled to corners of a heat-exchanging element; and
covers to form an upper surface and a lower surface of the heat exchanger and bring the corner guides into close contact with the liners and spacers,
wherein each of the corner guides comprises a guide channel forming a space between each corner of the heat-exchanging element and an inner surface of each corner guide, and contacts extended from both ends of the guide channel to contact adjacent sides of each corner of the heat-exchanging element, and
wherein the guide channel comprises a corner receiving portion into which each corner of the heat-exchanging element is inserted, and a fixing portion having a cylindrical space between the corner receiving portion and the inner surface of each corner guide to insert a fastener to secure each cover, the cylindrical space having a portion which is open to the corner receiving portion, and
wherein each cover comprises flanges which cover outer sides of the corner guides so as to bring the corner guides into contact with the heat-exchanging element, and the contacts include, at outer surfaces thereof, stepped surfaces respectively formed so that the flanges can be mounted to the stepped surfaces respectively.

14. The ventilator according to claim 13, wherein the guide channel comprises the corner receiving portion into which each corner of the liners and spacers is inserted.

15. The ventilator according to claim 13, wherein the heat-exchanging element comprises layers formed by the adjacent liners, and first and second passages disposed in the layers alternatively in first and second directions crossing with each other, respectively.

16. The ventilator according to claim 15, wherein the corner guides prevent air passing through the first and second passages from being mixed.

17. The ventilator according to claim 13,
wherein the contacts extended from both sides of the fixing portion to contact adjacent sides of the heat-exchanging element.

18. The ventilator according to claim 17, wherein the corner guides each further comprises:
 an adhesive disposed in the corner receiving portion to attach the corner guide to the corner of the heat-exchanging element.

19. The ventilator according to claim 16, wherein the ventilator comprises intake passages communicating with the first passages, exhaust passages communicating with the second passages, and partitions disposed between the intake and exhaust passages, and the corner guide is disposed between the corner of the heat-exchanging element and an end of the partition.

* * * * *

UNITED STATES PATENT AND TRADEMARK OFFICE
CERTIFICATE OF CORRECTION

PATENT NO. : 8,955,578 B2  
APPLICATION NO. : 11/599273  
DATED : February 17, 2015  
INVENTOR(S) : Young-Chul Kwon et al.

Page 1 of 1

It is certified that error appears in the above-identified patent and that said Letters Patent is hereby corrected as shown below:

In the Claims  
Claim 13, column 8, line 36, delete "element, and" and insert --element,-- therefor.

Signed and Sealed this  
Seventh Day of July, 2015

Michelle K. Lee  
*Director of the United States Patent and Trademark Office*